United States Patent
Hyvarinen et al.

(10) Patent No.: US 8,224,939 B2
(45) Date of Patent: Jul. 17, 2012

(54) SYSTEM AND METHOD FOR UTILIZING ENVIRONMENT INFORMATION IN UPNP AUDIO/VIDEO

(75) Inventors: Mikko A. Hyvarinen, Oulu (FI); Kari Kaarela, Oulu (FI); Jukka Parkkinen, Oulu (FI); Kirmo Koistinen, Oulu (FI)

(73) Assignee: Core Wireless Licensing, S.A.R.L., Luxembourg (LU)

( * ) Notice: Subject to any disclaimer, the term of this patent is extended or adjusted under 35 U.S.C. 154(b) by 1562 days.

(21) Appl. No.: 11/386,516

(22) Filed: Mar. 22, 2006

(65) Prior Publication Data

US 2007/0226346 A1    Sep. 27, 2007

(51) Int. Cl.
 *G06F 15/173* (2006.01)
(52) U.S. Cl. ......... 709/223; 709/217; 709/227; 709/250
(58) Field of Classification Search .......... 709/227, 709/228, 250, 203, 217, 219, 223; 455/412.1, 455/503
See application file for complete search history.

(56) References Cited

U.S. PATENT DOCUMENTS

| | | | |
|---|---|---|---|
| 6,792,323 B2 * | 9/2004 | Krzyzanowski et al. | 700/90 |
| 7,092,768 B1 * | 8/2006 | Labuda | 700/19 |
| 7,328,045 B2 * | 2/2008 | Funk et al. | 455/560 |
| 7,337,402 B2 * | 2/2008 | Milton et al. | 715/730 |
| 2003/0117433 A1 * | 6/2003 | Milton et al. | 345/738 |
| 2004/0117829 A1 | 6/2004 | Karaoguz et al. | |
| 2005/0096753 A1 | 5/2005 | Arling et al. | |
| 2005/0128048 A1 * | 6/2005 | Krzyzanowski et al. | 340/3.71 |
| 2005/0204065 A1 * | 9/2005 | Son et al. | 709/248 |
| 2006/0143298 A1 * | 6/2006 | Anttila et al. | 709/227 |
| 2006/0153072 A1 * | 7/2006 | Bushmitch et al. | 370/230 |
| 2006/0168126 A1 * | 7/2006 | Costa-Requena et al. | 709/219 |
| 2006/0190571 A1 * | 8/2006 | Kim et al. | 709/220 |
| 2006/0198448 A1 * | 9/2006 | Aissi et al. | 375/259 |
| 2006/0200570 A1 * | 9/2006 | Stirbu et al. | 709/230 |
| 2006/0245403 A1 * | 11/2006 | Kumar | 370/338 |
| 2006/0258289 A1 * | 11/2006 | Dua | 455/41.3 |
| 2007/0171091 A1 * | 7/2007 | Nisenboim et al. | 340/825.69 |

(Continued)

FOREIGN PATENT DOCUMENTS

WO    WO 2004/061710 A1    7/2004

(Continued)

OTHER PUBLICATIONS

Supplementary European Search Report for European Application No. 07 73 4072 dated Mar. 5, 2010.

(Continued)

*Primary Examiner* — Lashonda Jacobs
(74) *Attorney, Agent, or Firm* — AlbertDhand LLP

(57) ABSTRACT

An environment variable for use cases such as UPnP AV use cases. The environment variable of the present invention is used to store the physical location of the user. For example, the environment variable can be used to identify a particular location as being a user's living room, kitchen, etc. The information stored in the environment variable can be used to enhance the user experience of the digital home or other environment by minimizing the number of manual selections that the user has to make in order to initiate a use case such as playing music in a bedroom or watching movies in a living room. The environment variable is used to trigger a change of a profile and select the devices needed to implement different use scenarios.

33 Claims, 5 Drawing Sheets

U.S. PATENT DOCUMENTS

| | | | |
|---|---|---|---|
| 2008/0137631 A1* | 6/2008 | de Clerq et al. | 370/338 |
| 2008/0263173 A1* | 10/2008 | Weber et al. | 709/217 |
| 2008/0279161 A1* | 11/2008 | Stirbu et al. | 370/338 |
| 2009/0216351 A1* | 8/2009 | Van Horck et al. | 700/94 |

FOREIGN PATENT DOCUMENTS

| | | |
|---|---|---|
| WO | WO-2005/078676 | 8/2005 |

OTHER PUBLICATIONS

Y. Gsottberger, et al. "Embedding Low-Cost Wireless Sensors into Universal Plug and Play Environment." Wireless Sensor Networks, Jan. 14, 2004, pp. 291-306.

English translation of Office Action for corresponding Korean Application No. 10-2008-7025743.
Office Action for Korean Patent Application No. 10-2008-7025743, dated Jun. 30, 2011.
English translation of Office Action for Korean Patent Application No. 10-2008-7025743, dated Jun. 30, 2011.
Office Action in European Patent Application No. 07 734 072.7-2416 dated Mar. 11, 2011.
Office Action in Chinese Patent Application No. 200780010084.5 dated Nov. 17, 2011.
English Translation of Office Action in Chinese Patent Application No. 200780010084.5 dated Nov. 17, 2011.

* cited by examiner

SYSTEM AND METHOD FOR UTILIZING ENVIRONMENT INFORMATION IN UPNP AUDIO/VIDEO

FIELD OF THE INVENTION

The present invention relates generally to Universal Plug and Play (UPnP) devices. More particularly, the present invention relates to the use of various profiles in UPnP devices.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

UPnP is one of the technical cornerstones of the Digital Living Network Alliance (DLNA), a group which is working towards a wired and wireless interoperable network of Personal Computers (PC), Consumer Electronics (CE) and mobile devices in the home, enabling a seamless environment for sharing and growing new digital media and content services. UPnP technology defines an architecture for pervasive peer-to-peer network connectivity of intelligent appliances, wireless devices, and personal computers of all types. UPnP technology is designed to bring easy-to-use, flexible, standards-based connectivity to ad-hoc or unmanaged networks whether in the home, in a small business, public locations, or systems connected to the Internet. UPnP technology provides a distributed, open networking architecture that leverages TCP/IP and web technologies to enable seamless proximity networking, in addition to providing control and data transfer among networked devices.

The UPnP Device Architecture (UDA) is designed to support zero-configuration, "invisible" networking and automatic discovery for a breadth of device categories from a wide range of vendors. With UDA, a device can dynamically join a network, obtain an IP address, convey its capabilities, and learn about the presence and capabilities of other devices.

In current UPnP audio/video (AV) environments (also used by DLNA), a user typically has to make a number of different selections in order to initiate an AV use case. For example, if a user wants to watch a movie in his or her living room, the user must (a) search/browse/select the content to be viewed, (b) select the AV renderer device, and potentially (c) make some adjustments to the rendering device, such as adjusting the volume on the rendering device, etc. Even in an environment that is not very complex in nature, such as when there is only one rendering device in the room and only a limited number of content items, this process can be cumbersome. For novice users, this process is especially difficult to implement. In the future, however, it is likely that people will have several rendering devices in various rooms in their homes, they will have access to more and more different multimedia items, and they will have access to a growing number of UPnP environments. It will therefore become increasingly aggravating for a user to be constantly making the above mentioned selections each time the user attempts to start using UPnP AV equipment at his or her disposal.

In light of the above, it would therefore be desirable to provide a system and method that reduces the complexity involved in establishing various AV use cases.

SUMMARY OF THE INVENTION

The present invention provides for the use of an environment variable for UPnP AV use cases. The environment variable is used to store the physical location (e.g., a room at home) of the user. The information stored in the environment variable can be used to enhance the user experience of the digital home (or other location) by minimizing the number of manual selections that the user has to perform in order to initiate a use case. The environment variable is used to trigger the change of the profile and select the devices needed to implement the use cases. By minimizing the number of manual selections that the user has to make in order to initiate an AV use case, the present invention improves the usability of the UPnP/DLNA devices at issue. The present invention could be implemented in a wide variety of different types of UPnP AV devices of control points and provides added value to the manufacturers of such devices.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF PREFERRED EMBODIMENTS

The present invention provides for the use of an environment variable for UPnP use cases such as UPnP AV use cases. The environment variable is used to store the physical location of the user. For example, the environment variable can be used to identify a particular location as being a user's living room, kitchen, etc. The information stored in the environment variable can be used to enhance the user experience of the digital home or other environment by minimizing the number of manual selections that the user has to make in order to initiate a use case such as playing music in a bedroom or watching movies in a living room. The environment variable is used to trigger a change of a profile and select the devices needed to implement the various possible use cases.

Figure 1:
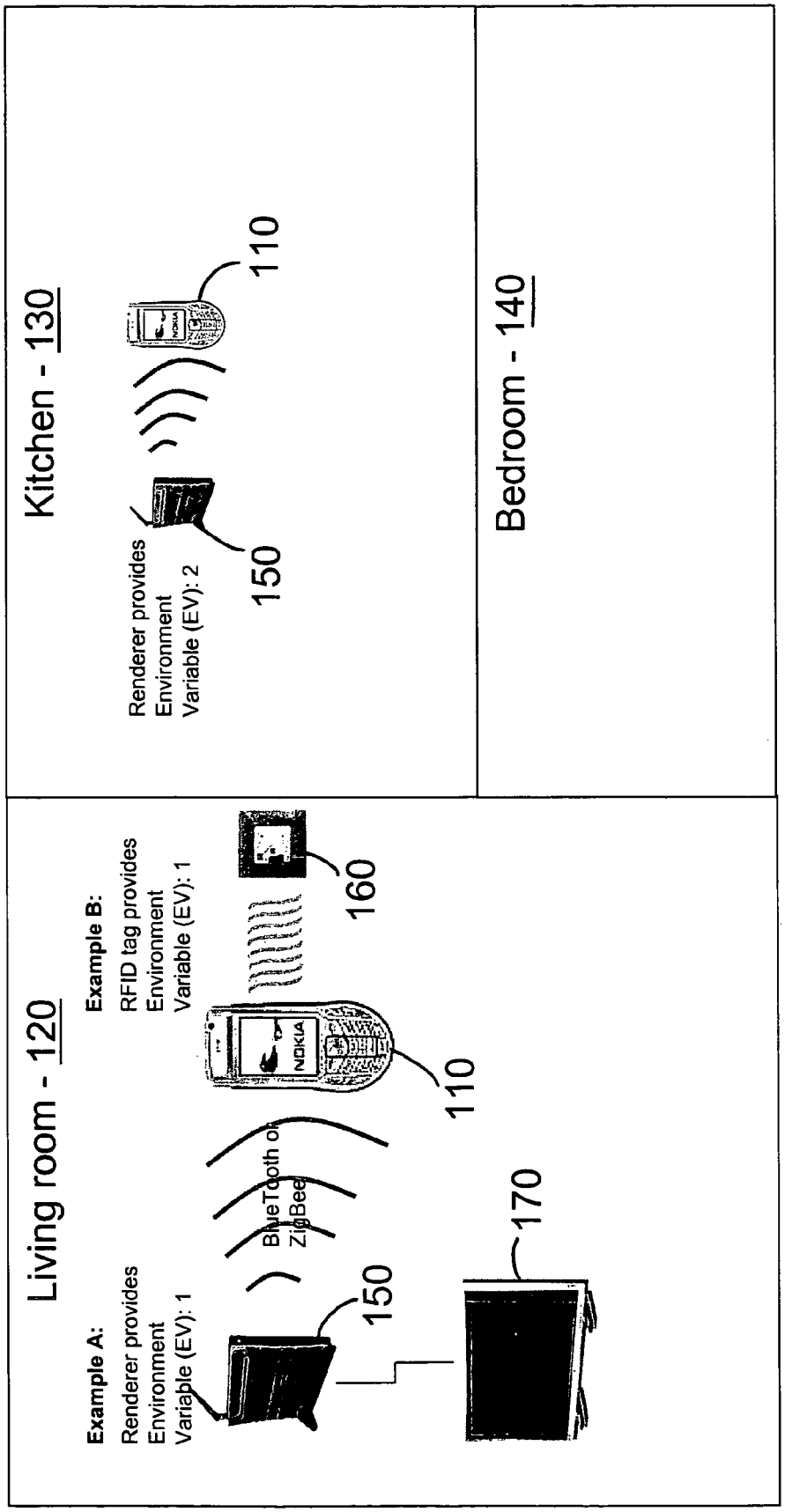
FIG. 1 is a representation of a generic home in which different environment variables of the present invention are provided to a UPnP device based upon the location of the UPnP device.

FIG. 1 is a representation of a generic home 100 in which different environment variables of the present invention are provided to a UPnP device 110 based upon the location of the UPnP device 110. The generic home 100 depicted in FIG. 1 includes a living room 120, a kitchen 130 and a bedroom 140. Both the living room 120 and the kitchen 130 include a renderer 150, which can be used to render content from the UPnP device 110 on different devices in the particular room and vice versa.

Various regions or rooms in an environment can be associated with a particular profile on the UPnP device 110. It should be noted that the term "profile" should not be interpreted as referring only to top level profiles or sub-profiles in a profile tree, for example of the type shown in FIG. 2 below. Instead, "profile" can refer to any top level profile or any lower level sub-profile.

A profile, if actuated, provides instructions as to how various devices in the region should operate in conjunction with the UPnP device 110. For example, a "home/living room" profile could include instructions to (1) set a higher volume level when content is played by a television 170; (2) open a "movies" directory in a storage device such as a personal computer that is located within the living room 120; (3) connect to "favorite" appliances; and (4) if the UPnP device 110 comprises a mobile telephone, to set the mobile telephone to a "silent" mode. Alternatively, the "home/kitchen" profile may include instructions to (1) set a lower volume level when content is played; (2) open a "music" directory in a storage device; (3) connect to "favorite" kitchen appliances; and (4) set the mobile telephone to a "normal" mode.

According to one embodiment of the present invention, when a user enters a particular room, an environment variable for that room or region is automatically provided to the user's UPnP device 110. As shown in FIG. 1, environment variables may be provided to the UPnP device 110 from different sources. For example, when the UPnP device 110 enters the kitchen 130, the renderer 150 located in the kitchen 130 can provide the environment variable to the UPnP device 110. When entering the living room 120, in addition to or instead of using the renderer 150 in the living room 120, an RFID tag 160 can be used to provide the particular environment variable. In this situation, the UPnP device 110 requires a RFID reader in order to obtain the environment variable. Other positioning methods include, but are not limited to, Zigbee, wireless LAN (WLAN), Bluetooth (BT) and ultra-wide bandwidth (UWB) positioning methods. Optical systems, such as systems incorporating a camera on the UPnP device 110, may also be used. Furthermore, it is also possible to obtain the environment variable through manual input. For example, a user, when entering a room, could select a particular environment from a list of environments stored within the UPnP device. In addition to the above, it should be noted that the types of methods discussed above are not intended to comprise an exhaustive list, and other methods either present known or later developed could also be used. Although the positioning methods can vary, it is necessary that the UPnP device 110 be positioned with room-level accuracy in order to obtain the environment variable.

Figure 2:
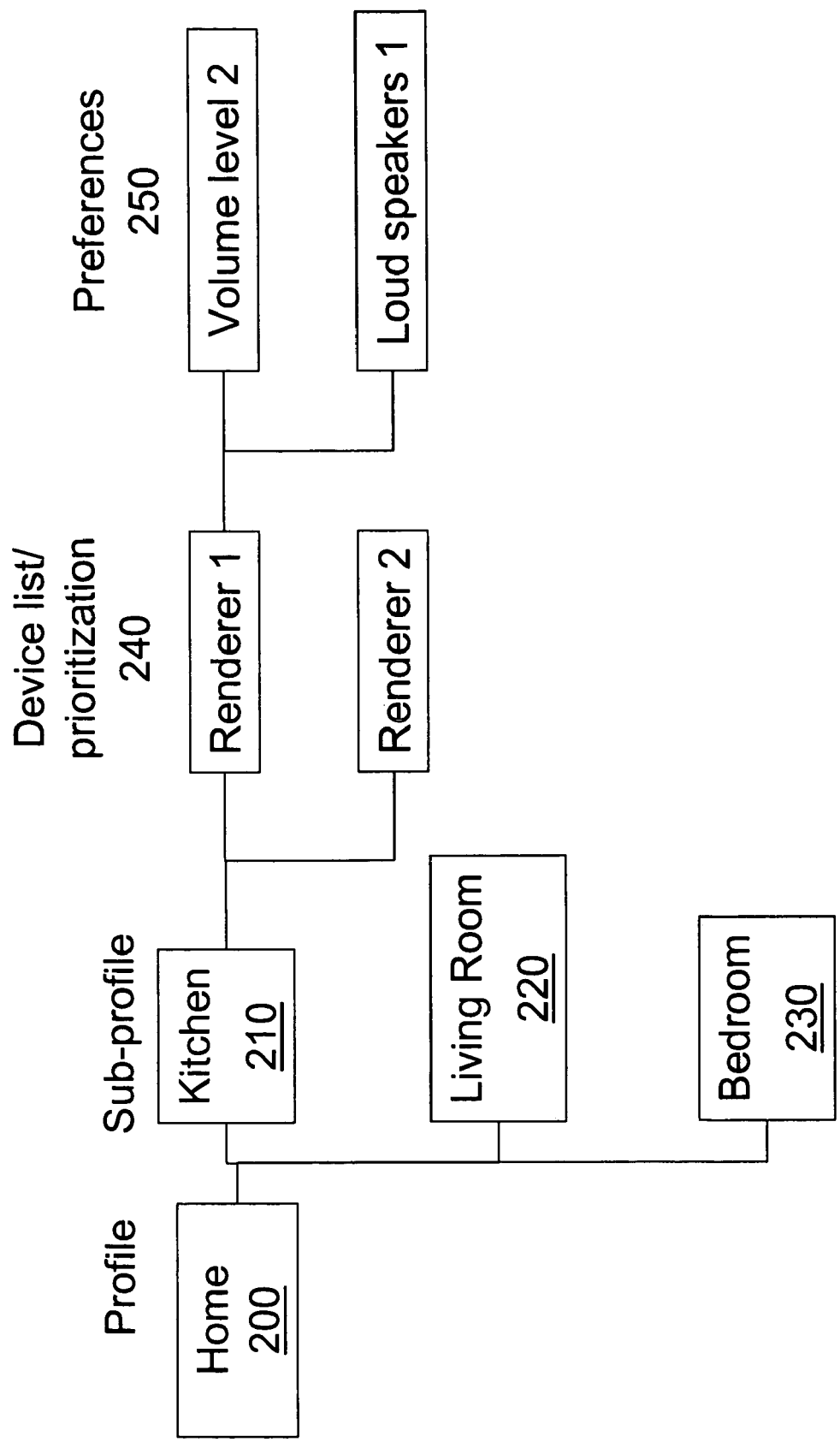
FIG. 2 is a chart showing an exemplary UPnP telephone profile augmented with sub-profiles and a room-specific device and settings table according to the present invention.

In one embodiment of the present invention, the environment variable is combined with profiles stored within the UPnP device 110, as well as their respective sub-profiles. Such profiles are commonly used in mobile telephones of various types. FIG. 2 is chart showing an exemplary UPnP telephone profile (a "home" profile 200) augmented with sub-profiles and a room-specific device and settings table according to the present invention. In addition to the "home" profile 200, the UPnP device may include a variety of other profiles known in the art (i.e., meeting, silent, etc.), as well as other profiles which can be created and/or modified by the user of the UPnP device 110.

In the chart depicted in FIG. 2, the "home" profile 200 includes a "kitchen" sub-profile 210, a "living room" sub-profile 220 and a "bedroom" sub-profile 230. For the "kitchen" sub-profile 210, there is also a device list/prioritization level 240. This level lists the devices located within the particular region at issue, as well as a priority system to indicate which rendering devices should be accessed first if possible. For one of these devices (Renderer 1), a set of preferences 250 are also included. In this particular example, a volume level of "2" is associated with Renderer 1, and a specific set of loud speakers (loud speakers 1) are to be used when Renderer 1 is played. A wide variety of other user preferences may be used. These preferences may include, but are not limited to, identification of particular or "favorite" content directories, preferred audio and video characteristics, etc. The user preferences can be defined and altered using a user interface of the UPnP device 110. In a particular embodiment of the invention, the user interface automatically prompts the user to create profile information when a new audio/video rendering device appears within the UPnP network within which the UPnP device 110 is located.

Figure 3:
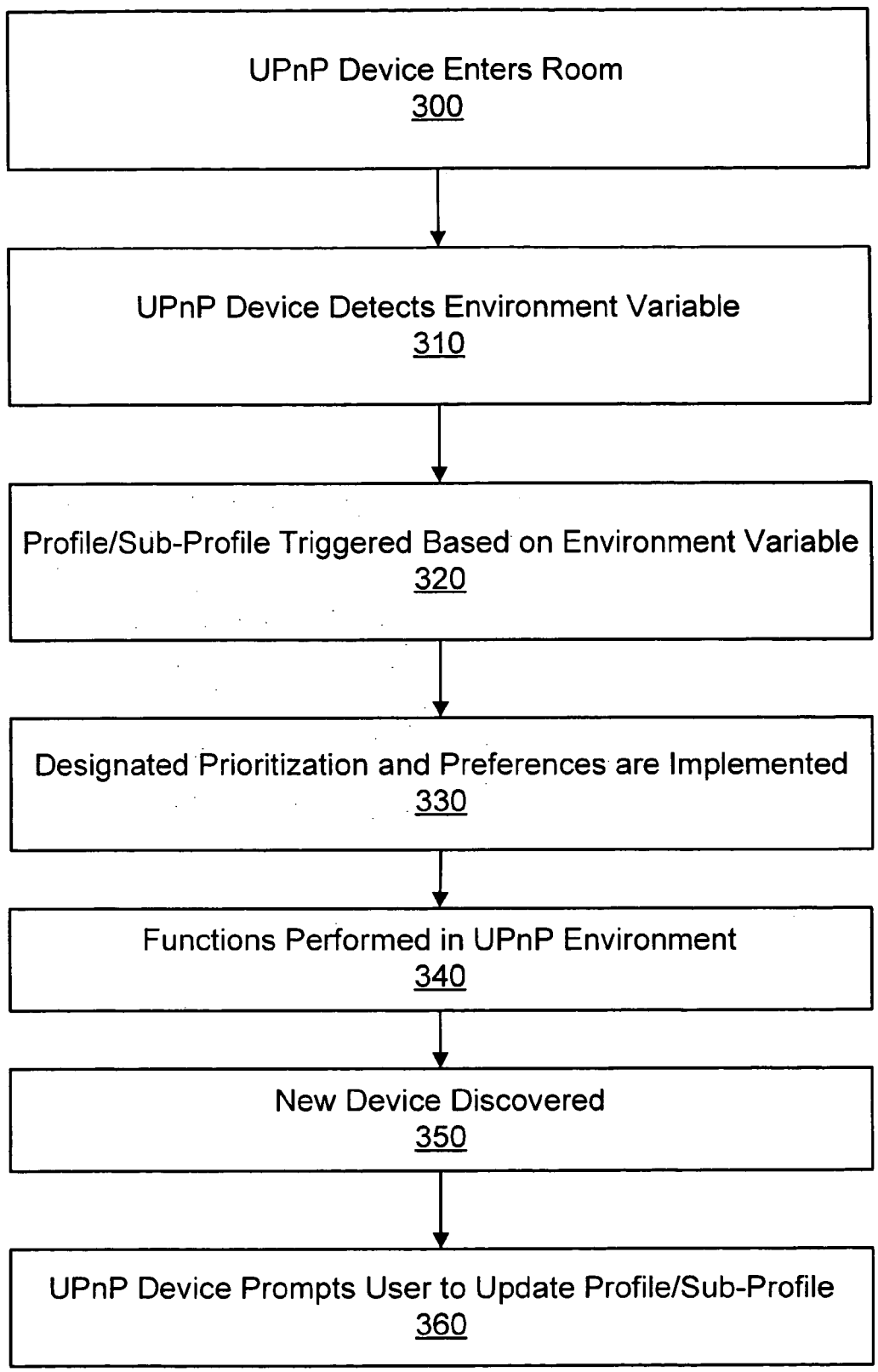
FIG. 3 is a flow chart showing the implementation of one embodiment of the present invention.

FIG. 3 is a flow chart showing the implementation of one embodiment of the present invention. At 300 in FIG. 3, the UPnP device 110 enters a particular room. At 310, the UPnP device 110 detects a designated environment variable for the room. As discussed above, the environment variable can be detected using a wide variety of systems. At 320, the UPnP device 110 triggers a specific profile and/or sub-profile based upon the indication of the environment variable. For example, if the environment variable includes a "kitchen" indication, then the UPnP device 110 would activate the "kitchen" sub-profile 210 of FIG. 2. At 330, the designated prioritization levels and preferences for the selected profile/sub-profile are implemented accordingly. Once implemented and as represented at 340, the UPnP device 110 can perform a wide variety of functions within the UPnP network. For example, if the UPnP device is in the living room 120, songs stored on the UPnP device 110 could be played on a stereo (not shown) within the living room, movies stored on the UPnP device 110 could be played on the television 170, and content stored on other devices within the living room 120 could be played on the UPnP device 110. Other potential functions are well known in the art.

In some circumstances, represented at 350 in FIG. 3, a new device may be discovered in the environment. For example, a new kitchen appliance may have been installed in a kitchen area. In such a situation, at 360 the UPnP device 110 prompts the user to adjust the appropriate profile-sub-profile in order to take the changed environment into account. It should be noted that steps 350 and 360 do not necessarily have to occur after step 340 as shown in FIG. 3.

Figure 4:
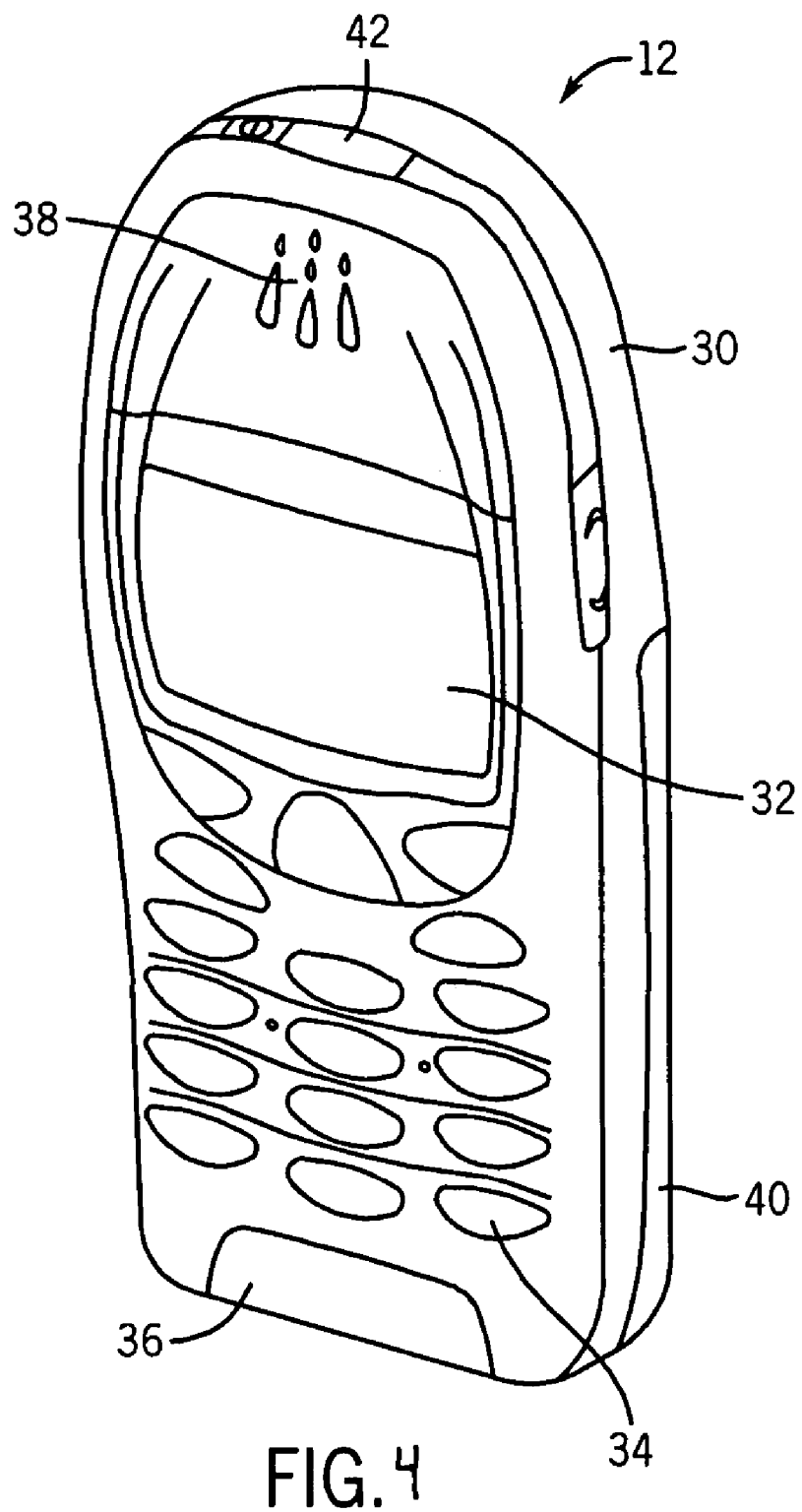
FIG. 4 is a perspective view of a mobile telephone that can be used in the implementation of the present invention.
Figure 5:
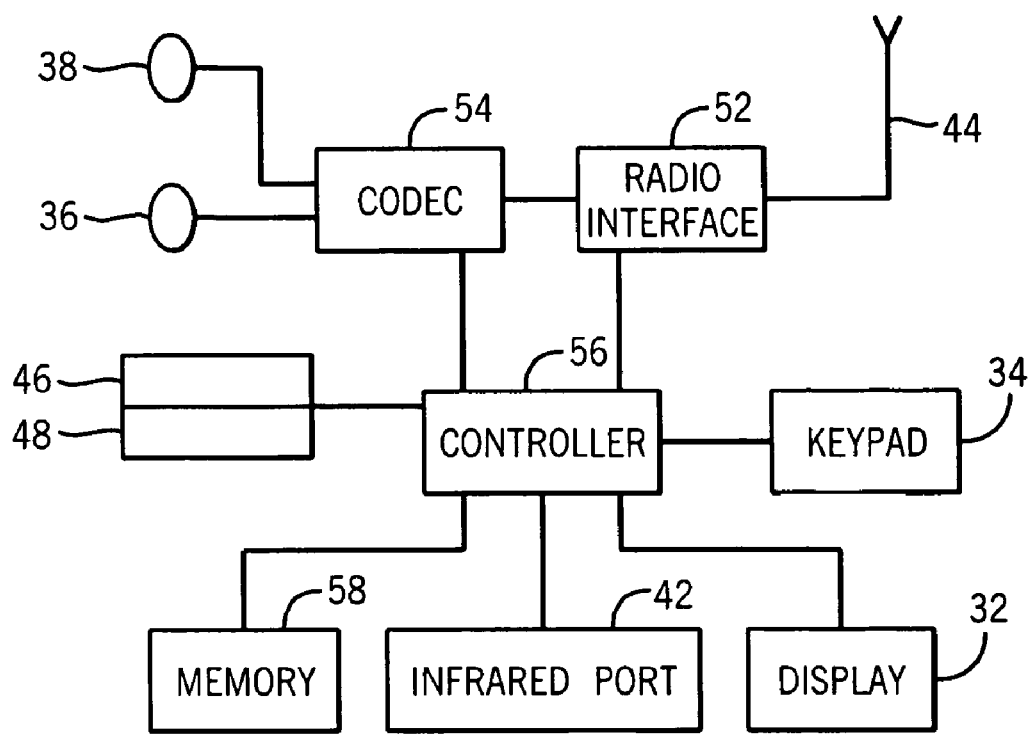
FIG. 5 is a schematic representation of the telephone circuitry of the mobile telephone of FIG. 4.

FIGS. 4 and 5 show one representative mobile telephone 12 which can serve as a UPnP device 110 and within which the present invention may be implemented. It should be understood, however, that the present invention is not intended to be limited to one particular type of mobile telephone 12 or other electronic device. Instead, electronic devices such as personal digital assistants, laptop computers, integrated messaging devices, and other devices may be used, both as a requesting device and as a media server. A UPnP device of the present invention should therefore not be interpreted as being limited to a mobile telephone 12.

The mobile telephone 12 of FIGS. 4 and 5 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

Communication devices of the present invention may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method of selectively implementing profile features for a UPnP device within a UPnP environment using a user's mobile UPnP device, the method comprising:
   receiving in the user's mobile UPnP device an environment variable related to a UPnP environment;
   triggering, with the user's mobile UPnP device, specific profile information associated with the user in response to and based upon the received environment variable; and
   implementing, without manual selection, at least one profile-based feature for use within the UPnP environment, the at least one profile-based feature being based upon the triggered specific profile information.

2. The method of claim 1, wherein the environment variable comprises information regarding a room in which the UPnP device is located.

3. The method of claim 1, wherein the environment variable is received via a Bluetooth connection.

4. The method of claim 1, wherein the environment variable is received via a WLAN connection.

5. The method of claim 1, wherein the environment variable is received via Zigbee specifications.

6. The method of claim 1, wherein the environment variable is received via reading a RFID tag.

7. The method of claim 1, wherein the environment variable is received via a UWB connection.

8. The method of claim 1, wherein the specific profile information includes user preferences for exhibiting media on devices within the UPnP environment.

9. The method of claim 8, wherein the user preferences include preferences regarding a volume level at which the media is to be exhibited.

10. The method of claim 1, wherein the specific profile information includes instructions for the UPnP device to connect to at least one device within the UPnP environment.

11. The method of claim 1, wherein the specific profile information includes instructions to open a specific directory within the UPnP environment.

12. The method of claim 1, wherein the specific profile information includes instructions to alter a mode in which the UPnP device is operating.

13. The method of claim 1, wherein the UPnP device comprises a mobile telephone.

14. The method of claim 1, wherein the specific profile information includes priority information with regard to other devices within the UPnP environment.

15. The method of claim 1, further comprising:
   detecting the presence of a new device within the UPnP environment; and
   in response to the detection, prompting a user to adjust the specific profile information.

16. A computer program product, embodied in a computer-readable medium, for selectively implementing profile features for a UPnP device within a UPnP environment using a user's mobile UPnP device, the product comprising:
   computer code for receiving an environment variable related to a UPnP environment in the user's mobile UPnP device;
   computer code for triggering, with the user's mobile UPnP device, specific profile information associated with the user in response to and based upon the received environment variable; and
   computer code for implementing, without manual selection, at least one profile-based feature for use within the UPnP environment, the at least one profile-based feature being based upon the triggered specific profile information.

17. The computer program product of claim 16, wherein the environment variable comprises information regarding a room in which the UPnP device is located.

18. The computer program product of claim 16, wherein the specific profile information includes user preferences for exhibiting media on devices within the UPnP environment.

19. The computer program product of claim 18, wherein the user preferences include preferences regarding a volume level at which the media is to be exhibited.

20. The computer program product of claim 16, wherein the specific profile information includes instructions for the UPNP device to connect to at least one device within the UPnP environment.

21. The computer program product of claim 16, wherein the specific profile information includes instructions to open a specific directory within the UPnP environment.

22. The computer program product of claim 16, wherein the specific profile information includes instructions to alter a mode in which the UPNP device is operating.

23. The computer program product of claim 16, wherein the UPNP device comprises a mobile telephone.

24. The computer program product of claim 16, wherein the specific profile information includes priority information with regard to other devices within the UPnP environment.

25. A mobile UPnP device, comprising:
   a processor; and
   a memory unit in communication with the processor and including:
      computer code instructions for receiving in the user's mobile UPnP device an environment variable related to a UPNP environment;
      computer code instructions for triggering, with the user's mobile UPnP device, specific profile information associated with the user in response to and based upon the received environment variable; and
      computer code instructions for implementing, without manual selection, at least one profile-based feature for use within the UPnP environment, the at least one profile-based feature being based upon the triggered specific profile information.

26. The mobile UPnP device of claim 25, wherein the environment variable comprises information regarding a room in which the UPnP device is located.

27. The mobile UPnP device of claim 25, wherein the specific profile information includes user preferences for exhibiting media on devices within the UPnP environment.

28. The mobile UPNP device of claim 25, wherein the specific profile information includes instructions for the UPnP device to connect to at least one device within the UPNP environment.

29. The mobile UPNP device of claim 25, wherein the specific profile information includes priority information with regard to other devices within the UPNP environment.

30. A UPnP system environment, comprising:
   a mobile UPnP device associated with a user and configured to receive an environment variable related to the UPnP environment; and
   at least one UPnP renderer, wherein the mobile UPnP device is configured to, upon receiving the environment variable, trigger specific profile information associated with the user and implement, without manual selection, at least one profile-based feature for use in conjunction with the at least one UPnP renderer, the at least one profile-based feature being based upon the triggered specific profile information.

31. The UPnP system environment of claim 30, wherein the specific profile information includes user preferences for exhibiting media on the at least one UPnP renderer.

32. The UPnP system environment of claim 30, wherein the specific profile information includes instructions for the UPnP device to connect to the at least one UPnP renderer.

33. The UPnP system environment of claim 30, wherein the specific profile information includes priority information with regard to the at least one UPnP renderer.

* * * * *